Nov. 13, 1934.   R. J. BURROWS ET AL   1,980,663
WHEEL
Filed Aug. 4, 1932
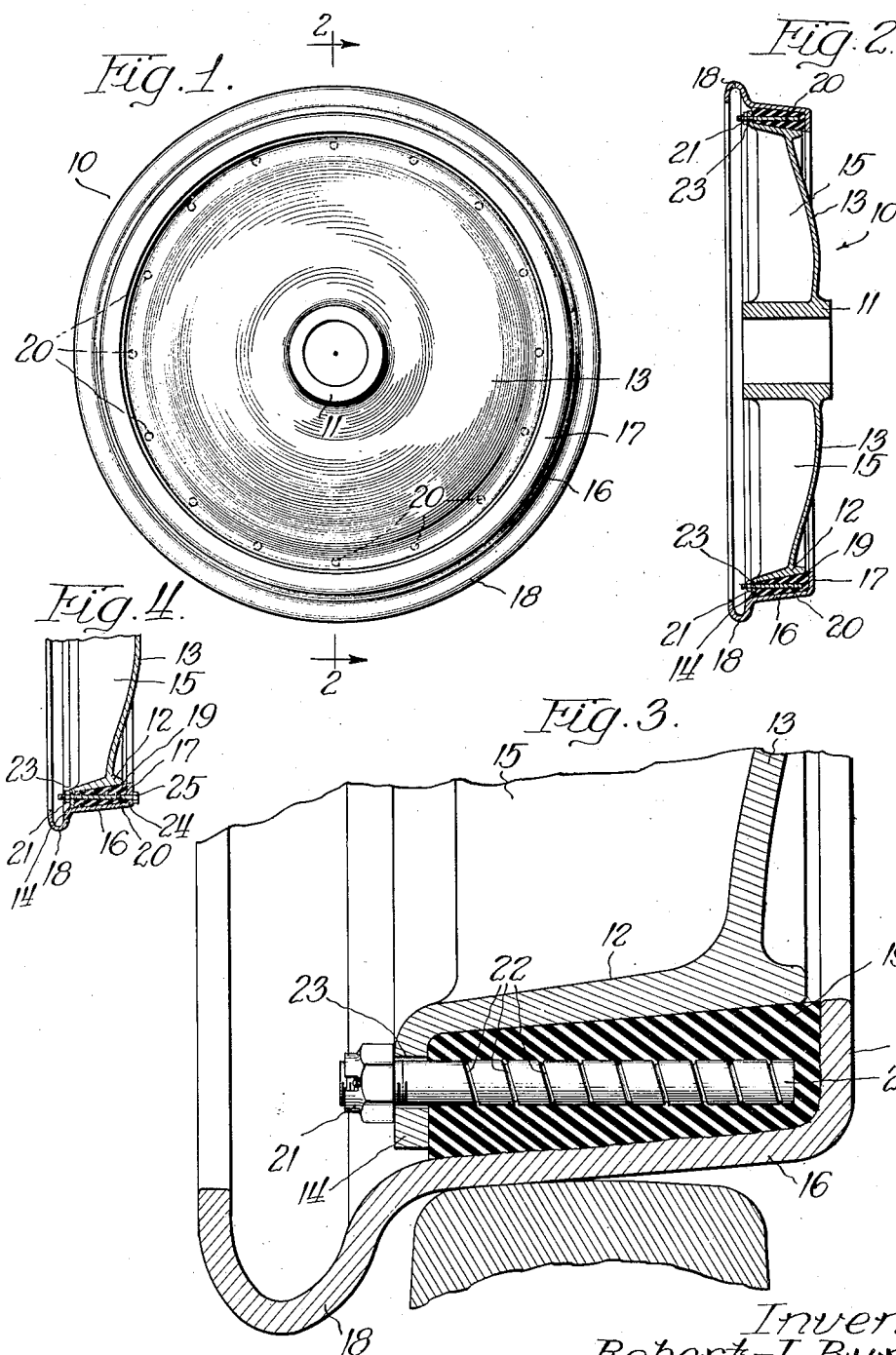
Inventors.
Robert J. Burrows,
Alfred O. Williams.
By Brown, Jackson, Boettcher & Dienner, Attys.

Patented Nov. 13, 1934

1,980,663

UNITED STATES PATENT OFFICE 1,980,663

WHEEL

Robert J. Burrows and Alfred O. Williams, Battle Creek, Mich., assignors to Clark Tructractor Company, Battle Creek, Mich., a corporation of Michigan Application August 4, 1932, Serial No. 627,410

1 Claim. (Cl. 295—11)

This invention relates to wheels and is more particularly concerned with the type of wheels employed on rail cars of light weight construction.

Heretofore, wheels for rail cars have quite generally been constructed of steel or rolled iron, and in some instances of pressed paper, and the wheel then provided with a steel tire. Such tires are usually of tough wrought steel, which are shrunk onto the periphery of the rim of the wheel to provide a wearing surface that may be as durable as possible. Such a construction of wheel is advantageous in that when the tires become worn they may readily be turned off of the wheel and a new tire shrunk thereon, thereby obviating the necessity of discarding the entire wheel when the wearing surface thereof becomes worn.

There are, however, a number of disadvantages to wheels of the above described construction. Because of the heaviness of rail cars as they are constructed in the light of present day practice, there is a considerable impact of the wheels upon the rail joints, frogs, switches, etc., over which such wheels pass. This results in injury to both the car and to the rail connections. Furthermore, there is considerable noise created by such wheels in their movement over the rail connections, which is objectionable. Such rails do not, therefore, promote restful riding.

Because of the above described disadvantages of car wheels, as now constructed, considerable attention has been paid recently to the designing and developing of rubber tired wheels for use on rail cars. The use of rubber tired wheels on rail cars is advantageous in that in wheels of such construction substantially all of the impact of the wheels on the rail connections will be absorbed by the rubber tires. Consequently there will be less injury to the rail connections. Further the noise heretofore caused by the wheels on the rails will be substantially eliminated, because of the cushioning effect of the rubber or similar material.

Briefly, the present invention has for its principal object the incorporation into a wheel of the desirable features of both of the above described types of car wheels. As will hereinafter more fully appear, the wheel of the present invention is constructed of steel or rolled iron and is equipped with a tire of tough wrought steel having a ring of resilient material vulcanized to the inner surface thereof. The ring of resilient material when in position on the wheel is thus disposed between the inner surface of the tire and the outer surface of the rim of the wheel. Novel securing means serves to secure the tire to the wheel, as will also hereinafter more fully appear.

The advantages of a wheel constructed in accordance with the principles of the present invention are, that such a wheel requires the minimum amount of rubber and allows of a relatively light weight wheel construction which is most desirable in a rail wheel where quick acceleration is desirable. The durable wearing surface of the steel tire is retained. There will be sufficient cushioning between the tire contact on the rails and the wheel hub to materially reduce wheel impact of the tire on the rail joints, etc. This quiets the rolling of the tire on the rail and practically eliminates the transfer of noise from the tire to the hub of the axle. Furthermore, when the steel tire becomes worn it may be readily removed from the wheel and a new one substituted.

Other features and advantages of the invention will appear from the following detailed description when taken in connection with the accompanying drawing, in which:

Figure 1 is a front elevational view of a car wheel embodying the principles of the present invention;

Figure 2 is a vertical sectional view taken substantially on the line 2—2 of Figure 1;

Figure 3 is an enlarged fragmentary vertical sectional view illustrating the wheel rim and tire construction; and Figure 4 illustrates a modified manner of securing the tire and the resilient means to the wheel.

Referring now in detail to the drawing, the wheel of the present invention, designated generally by the reference character 10, is preferably formed of steel or rolled iron and comprises a hub 11 and rim 12, connected together by a web 13. The hub 11 is of the usual construction of hub employed in wheels for rail cars and, therefore, need not be further described here.

The rim 12 comprises an endless rim of conical configuration, which is formed integrally with the web 13 and extends inwardly therefrom. Preferably, although not necessarily, the degree of taper of the rim is the same as the degree of taper now commonly employed in tire construction. A radial flange or shoulder 14, formed on the inner edge of said rim, extends outwardly radially therefrom for a purpose that will hereinafter appear. Preferably, ribs 15, extendng between the hub 11 and the rim 12, are formed integrally with the web 13, and the aforementioned members, to distribute the load carried by said web and to reinforce the latter.

The tire 16 is preferably formed of tough wrought steel and has approximately the same degree of taper as that of the rim 12. Adjacent its outer edge, the tire 16 is provided with an inwardly extending radial flange 17, while adjacent its inner edge the tire is provided with an outwardly extending radial flange 18. The flange 18 is preferably formed as shown, and serves to engage the inner sides of the rails, as in standard railroad practice. It will also be noted that the flange is so formed that it will clear the flange 14 of the rim 12 when the tire is put in place on the wheel.

It will be noted that when the tire 16 and wheel 10 are assembled a pocket will be formed between the tire and the wheel, said pocket being defined by the outer surface of the rim 12, the inner surface of the tire 16 and the two radial flanges 14 and 17, formed on the rim 12 and the tire 16, respectively. This pocket is adapted to be filled by a ring of resilient material 19.

The resilient material employed is preferably rubber. This rubber ring 19 is also conical in shape and seats upon the inner surface of the tire 16. Preferably, the rubber ring is vulcanized to the inner surface of the tire 16 as such vulcanizing can readily be done on a rough surface. Such procedure will also render unnecessary the relatively difficult matter of machining the inner surface of the tire.

The tire 16, including the rubber ring 19, is secured to the wheel 10 by means of bolts 20 and associated nuts 21. These bolts are preferably provided with a plurality of annular grooves 22, which are formed in said bolt at an angle to the axis thereof, spirally or otherwise. In the preferred construction, the bolts 20 stop short of the radial flange 17 and are vulcanized in the rubber ring 19, so that there will be no metal to metal contact between the tire 16 and the rim 12, these bolts extending outwardly of said ring and passing through an opening 23 provided in the flange 14 of rim 12. If desired, however, the bolts may also extend through an opening 24 provided in the flange 17 of tire 16, the head 25 of such bolt abutting the side surface of the radial flange 17, as shown in Figure 4. It will be noted that in either case the bolt 20 is connected with the flange 17 of tire 16. In one case, the bolt, which is vulcanized within the rubber ring 19, is connected to the flange 17 through the medium of the ring 19, which is vulcanized to the inner surface of the tire 16 and the flange 17. In the other case, the bolt 20 is of course extended through and connected directly with both the flange 14 and the flange 17.

The relative great area of contact between the inner surface of the rubber ring 19 and the flange 12 is ample to provide sufficient friction for driving or torque purposes, so that excessive pressure between the surfaces of the rim 12 and the rubber ring 19 is not required. Very little tightening of the nuts 21 will set up a considerable amount of friction between the rim 12 and the rubber ring 19 so that very little, if any, driving strain will be transmitted to the bolts 20. It will of course be apparent that the cone effect of the rubber ring will also accomplish this feature very readily and is of considerable importance in this type of wheel. It is always preferable to have rubber in its free state and under as little compression as possible. It is therefore contemplated making the rubber ring of such size that there will be a small clearance, approximately $\frac{1}{8}$ to $\frac{1}{16}$ of an inch, between the radial flange 14 and the laterally inner edge of the rubber ring 19 when the tire 16 is first set in place upon the wheel 12. Then by drawing down upon the nuts 21, a very firm contact can be obtained between the surfaces of the rim 12 and ring 19 and the rubber will thus be under very little compression.

It will also be noted, that the flanges 14 and 17 will serve to limit lateral deformation of the resilient means and in connection with the bolt 20 and rim 12, to aid in dissipating any heat which might be generated within the ring 19 by reason of kneading of the rubber. Also, laterally outward thrust of the wheel with respect to the rim will be resisted by the flanges 14 and 17 and the rubber therebetween.

While the hereinbefore described wheels have been referred to as being made of steel or rolled iron, it will be apparent that the wheels per se may readily be constructed of other suitable material, without in any way departing from the spirit and scope of the present invention. It will also be apparent to those skilled in the art, that changes in construction and arrangement of parts of the invention may be resorted to without departing from the field and scope of the same, and it is intended to include all such variations, as fall within the appended claims in this application, in which the preferred forms only of the invention are disclosed.

What is claimed is:

A wheel for rail cars comprising an endless rim of conical configuration, a flange formed on said rim and extending radially outwardly therefrom, a tire for said wheel, said tire being of conical configuration and having a flange extending radially inwardly therefrom, said flanges cooperating with said rim and tire to form a substantially closed pocket therebetween when said tire is positioned on said rim, resilient means comprising an endless ring having walls of generally conical configuration confined within said pocket, and means extending through one of said flanges and being adjustable to draw said resilient means and tire toward said flange and thereby tighten said resilient means and tire on said wheel by reason of the wedging action between the resilient conical ring with the conical rim and tire.

ROBERT J. BURROWS.
ALFRED O. WILLIAMS.